United States Patent [19]
Fan et al.

[11] Patent Number: 5,323,912
[45] Date of Patent: Jun. 28, 1994

[54] CONVEYER WITH AN AUTOMATED SORTING SYSTEM

[76] Inventors: Sheng-Hsiung Fan; Gang-Shyr Guan; Tun-Nien Hsu, all of 195, Chung Hsing Rd., Sec. 4, Chutung, Hsinchu, Taiwan

[21] Appl. No.: 40,258
[22] Filed: Mar. 30, 1993
[51] Int. Cl.⁵ .......................... B07C 5/28; B65G 47/46
[52] U.S. Cl. ..................................... 209/593; 209/606; 198/365; 198/437; 198/802
[58] Field of Search ............... 209/539, 595, 596, 606, 209/912, 593; 198/365, 372, 440, 448, 802, 437

[56] References Cited

U.S. PATENT DOCUMENTS

| | | | |
|---|---|---|---|
| 3,093,245 | 6/1963 | Worcester | 209/595 |
| 4,941,561 | 7/1990 | Yamabe et al. | 198/802 X |
| 4,984,675 | 1/1991 | Yamabe et al. | 198/365 |
| 5,191,959 | 3/1993 | Leemkuil | 198/365 |
| 5,230,417 | 7/1993 | Sato et al. | 198/365 |

FOREIGN PATENT DOCUMENTS

3120112  5/1991  Japan .................................. 198/365

Primary Examiner—D. Glenn Dayoan
Assistant Examiner—Tuan N. Nguyen
Attorney, Agent, or Firm—Bacon & Thomas

[57] ABSTRACT

A conveyer with an automated sorting system comprises a transport mechanism, a guide mechanism, and a sorting mechanism. A sorting sensor activates electrical spiral tubes which, in turn, actuate left and the right separation pieces to guide pins of the transport mechanism along desired guide rails so as to alter their original moving paths. More particularly, the guide pins are capable of moving along three different directions: left, middle, and right. The article intended to be transported is thus sorted out automatically and is sent to the designated area.

4 Claims, 9 Drawing Sheets

CONVEYER WITH AN AUTOMATED SORTING SYSTEM

BACKGROUND OF THE INVENTION

The present invention relates to a conveyor, and more particularly to a conveyor designed with an automated sorting system.

The articles or goods being transported on a conveyer of the conventional type are generally sorted out by manual labor or other means with poor efficiency and less uniformity throughout the sorting process.

A commonly used conveyor capable of doing an automated sorting of articles or goods being transported thereon is generally nothing but a conventional conveyer with a movable stop plate or a movable screen plate attached thereto. Upon having been actuated by a sensor, the stop plate or the screen plate works to push aside the subject article or goods to be transported to a designated area of classification to which it belongs. However, the article or goods sorted by the method described above is generally subject to damage.

SUMMARY OF THE INVENTION

It is, therefore, the primary objective of the present invention to provide a conveyer with an automated sorting system based on the change in moving direction of the sliding block carrying the article by means of a separation piece.

It is another objective of the present invention to provide a conveyer with an automated sorting system, which is capable of preventing machine parts from breaking down or being damaged due to an abnormal operation of the conveyor.

It is still another objective of the present invention to provide a conveyer with an automated sorting system, which can be maintained with ease and speed and can be easily dismantled and reassembled.

It is still another objective of the present invention to provide a conveyer with an automated sorting system comprising a sliding block capable of returning to its initial position after carrying a sorted article to its designated area.

DETAILED DESCRIPTION OF THE PREFERRED EMBODIMENT

Figure 1:
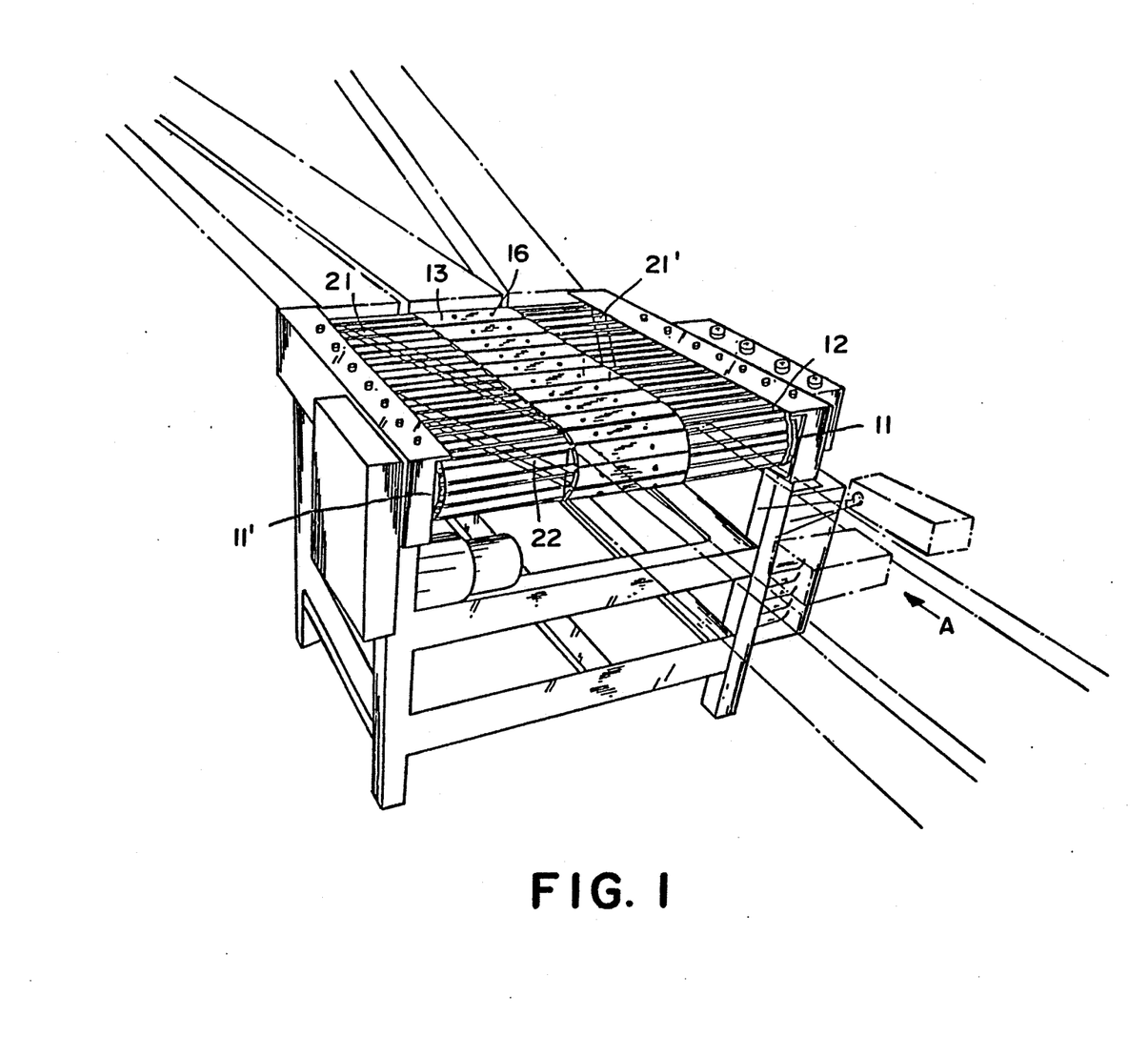
FIG. 1 shows a three-dimensional view of the preferred embodiment of the present invention.
Figure 2:
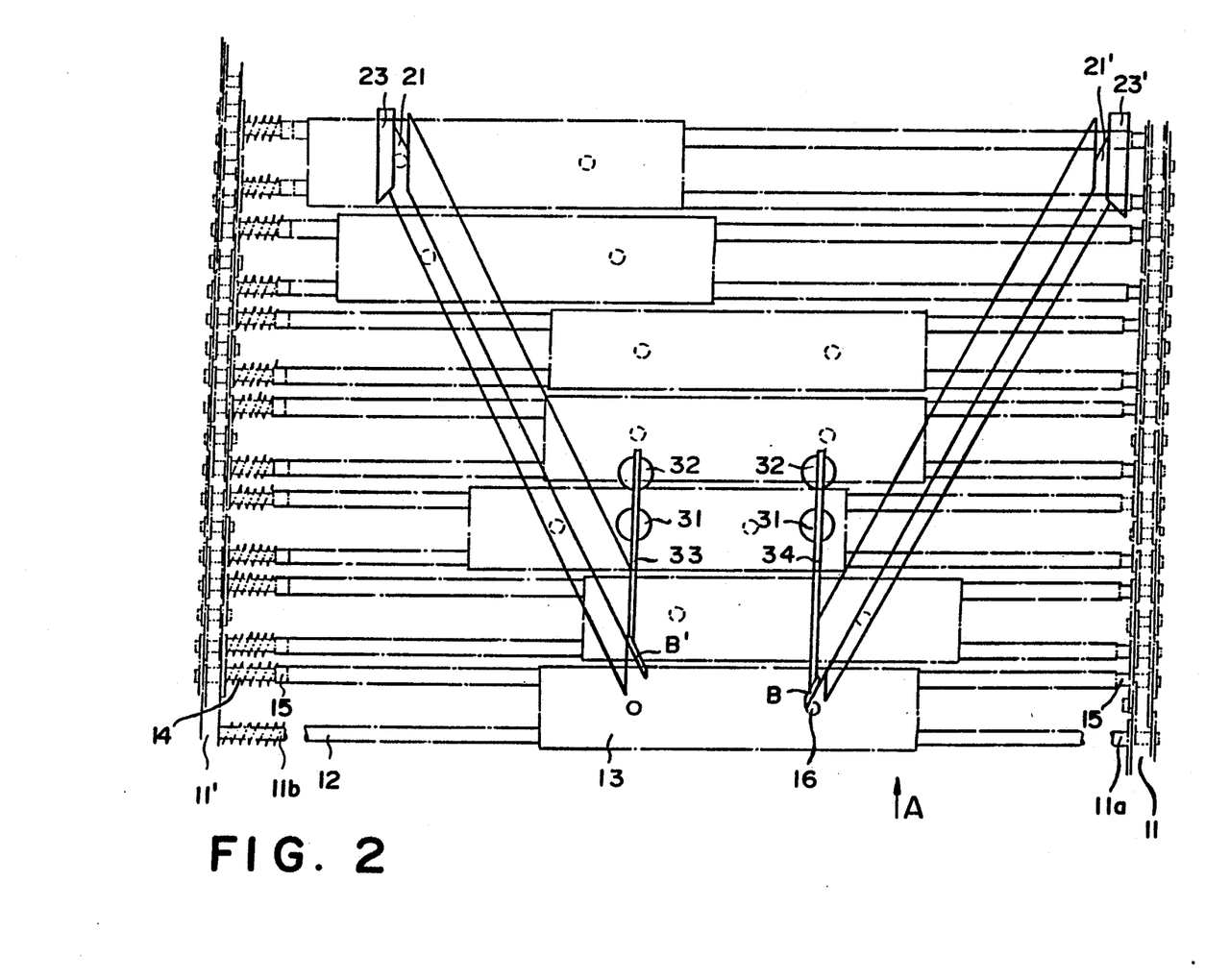
FIG. 2 is a top view showing a portion of the preferred embodiment of the present invention.

Referring to FIGS. 1 an 2, the conveyer with an automated sorting system embodied in the present invention is shown being connected to a main conveyer belt and three different conveyer belts. The preferred embodiment of the present invention comprises mainly a transport mechanism, a guiding mechanism, and a sorting mechanism.

The transport mechanism includes a set of parallel chains 11 and 11', a plurality of hollow sliding tubes 12 located between the two parallel chains 11 and 11', and the sliding blocks 13 located on the sliding tubes 12 for carrying articles intended to be transported. The parallel chain 11 has a short protruded pin 11a disposed alternately at the connection point thereof. Located at an opposite position of the short protruded pin 11a is a long protruded pin 11b on the parallel chain 11'. The long protruded pin 11b is encased by a compression spring 14. Both ends of the sliding tube 12 are fixed into a respective friction-reducing plastic sleeve 15. The sliding block 13 comprises two circular holes (not labeled) and two cone-shaped guide pins 16 located at the lower portion thereof. In the process of assembling the preferred embodiment of the present invention, one end of the sliding tube 12 must be in alignment with the long protruded pin 11b while the other end of the sliding tube 12 must be aligned with the short protruded pin 11a after the compression spring 14 has been compressed. Thereafter, the sliding tube 12 can be mounted on the parallel chains 11 and 11'.

Figure 9:
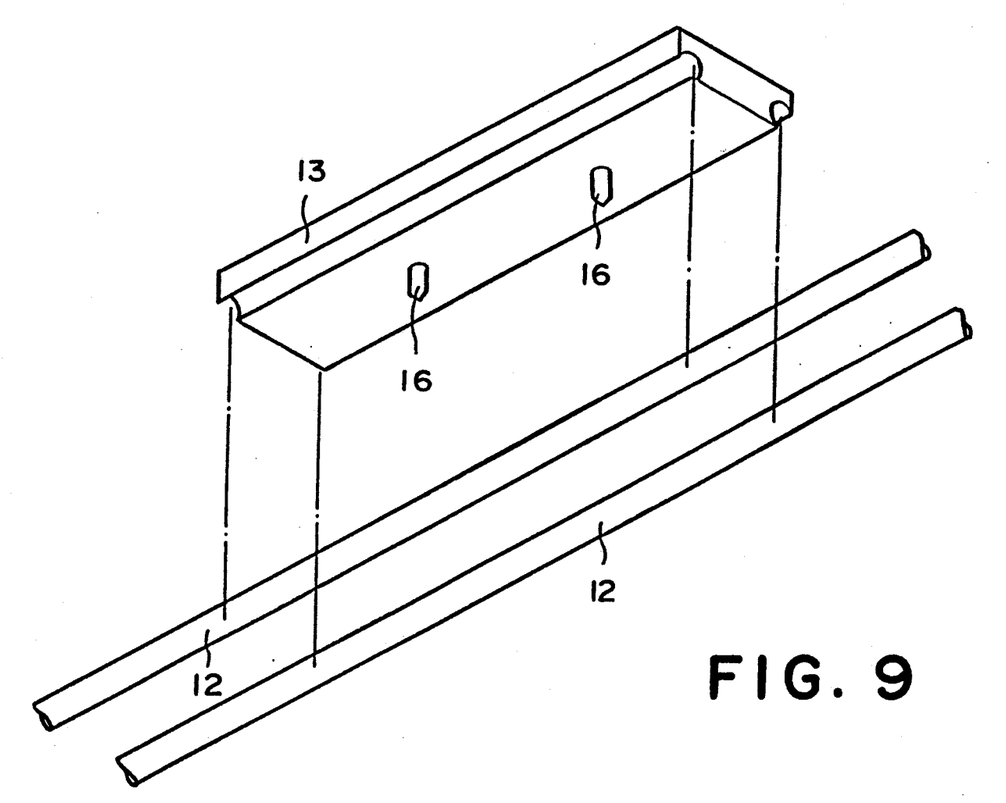
FIG. 9 shows a schematic view of assembling the sliding block of the preferred embodiment of the present invention.

Each sliding block 13 is slidably mounted upon two adjacent parallel sliding tubes 12 via the circular holes located at the bottom thereof (as shown in FIG. 9). As a result, the sliding blocks 13 are capable of sliding securely on the sliding tubes 12.

The guiding mechanism comprises a support frame (not shown in the drawings) upon which the left upper guide rail 21, the left lower guide rail 22, the right upper guide rail 21', and the right lower guide rail 22' are mounted securely. In addition, the left correction guide rail 23 and the right correction guide rail 23' are arranged at appropriate positions located at the ends of the left upper guide rail 21 and the right upper guide rail 21'.

Figure 3:
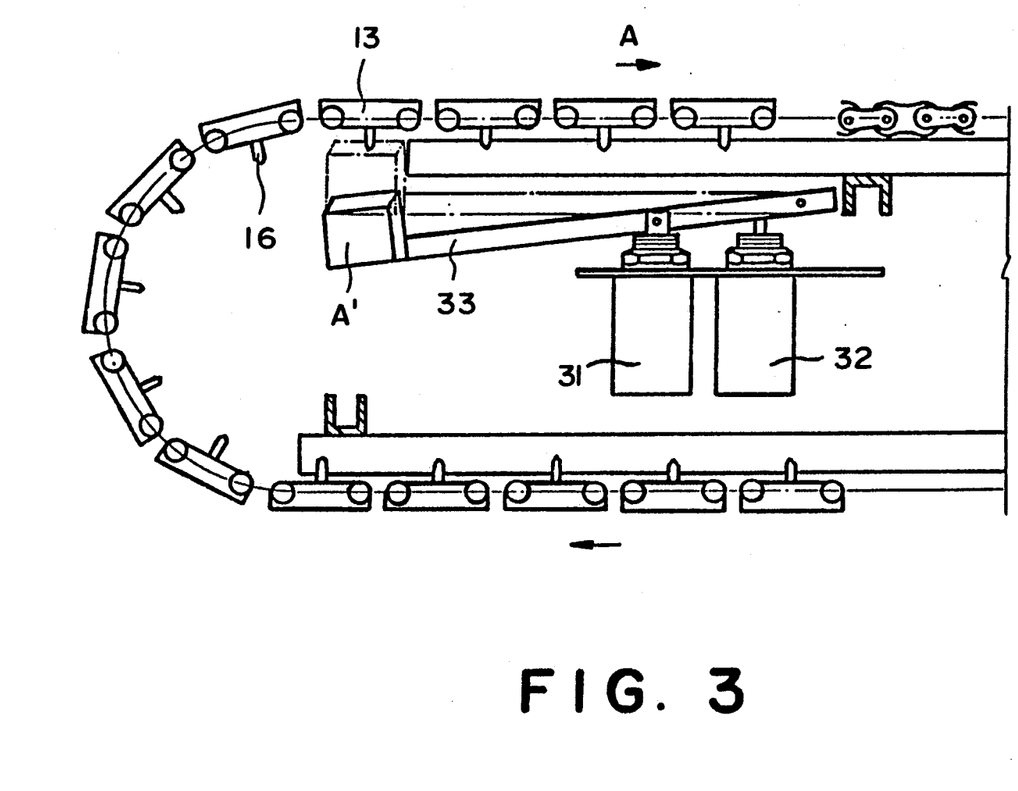
FIG. 3 shows a schematic view of the preferred embodiment in action according to the present invention.
Figure 4:
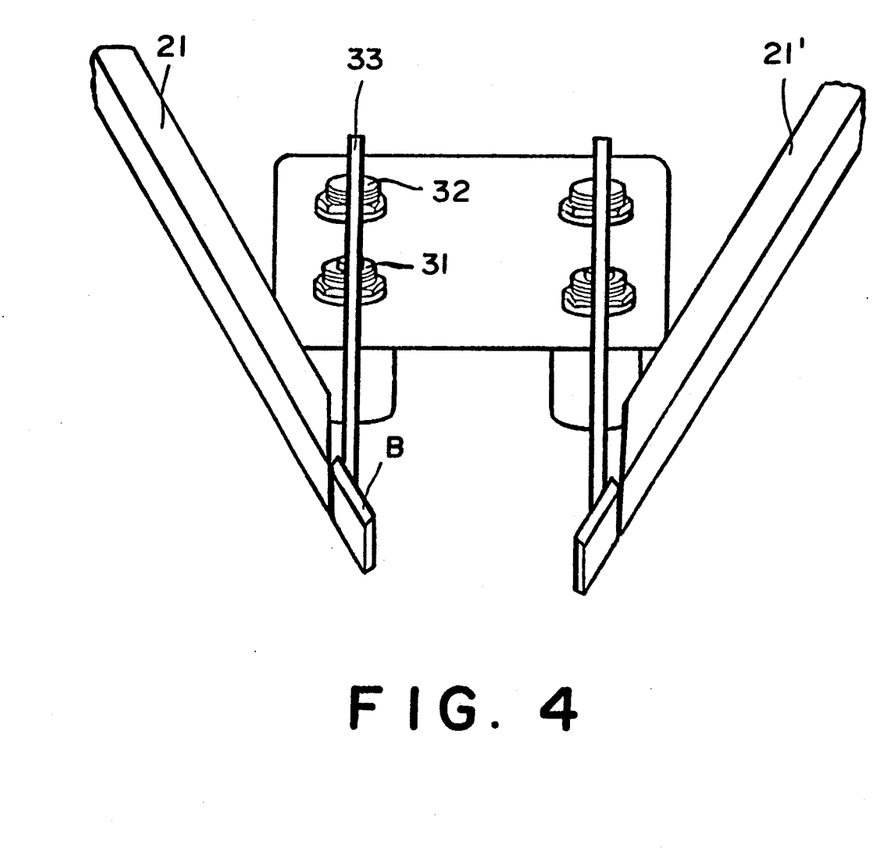
FIG. 4 is a schematic view showing the connection between the upper guide rail and A' of the preferred embodiment of the present invention.

The sorting mechanism is located under the left upper guide rail 21 and the right upper guide rail 21'. It comprises the pull-back electric spiral tube or solenoid 31, the push-out electric spiral tube or solenoid 32, the left separation piece 33, and the right separation piece 34. Each left separation piece 33 and right separation piece 34 comprises respectively a slant B, B' located at a position perpendicular to the moving direction of guide pins 16. The separation pieces 33 and 34 are fastened securely to pull-back electrical spiral tube 31 and push-out electrical spiral tube 32. Upon having been activated by a sorting signal, the push-out electrical spiral tube 32 actuates either left separation piece 33 or right separation piece 34 to move upward to a position level corresponding to that of a corresponding upper guide rail (left upper guide rail 21, right upper guide rail 21'). The side A' of the present separation piece is coupled with the upper guide rail to from a sliding plane. The pull-back electrical spiral tube 31 is capable of pulling separation pieces 33 and 34 back to the positions as shown in FIGS. 3 and 4.

Figure 6:
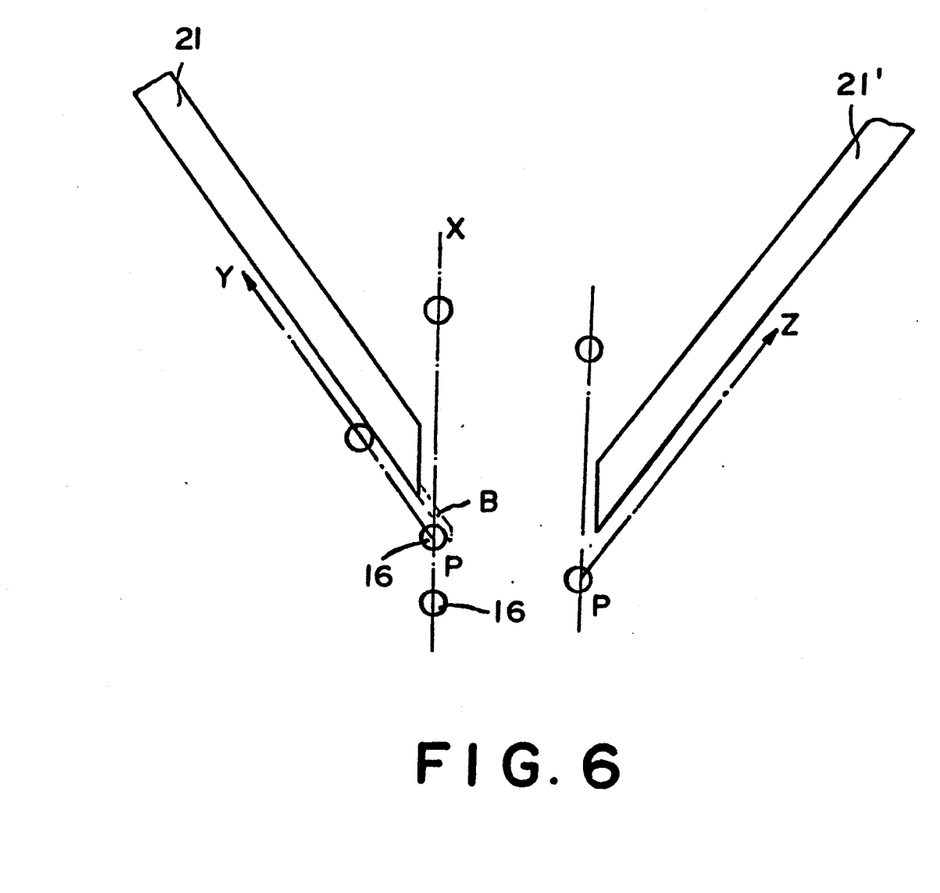
FIGS. 6 and 7 show schematic views illustrating the moving paths of the guide pin of the preferred embodiment of the present invention.
Figure 7:
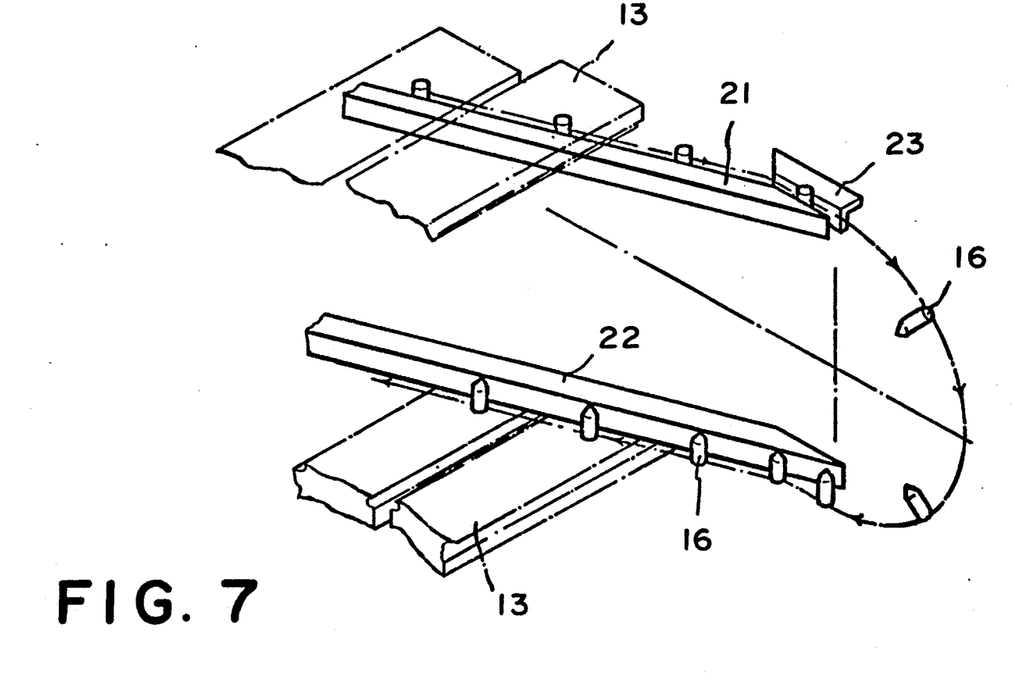

The sensor (not labeled but schematically indicated in FIG. 1) installed at the front end of the preferred embodiment of the present invention is capable of recognizing the article intended to be transported in terms of such sorting standards as size, weight, bar code, color, etc. When the article begins moving in a direction indicated by an arrow A and passes the sensor, the information on sorting standards of the article is passed on, in order to properly position the sliding block 13, from the sensor. If the information indicates that the article should be transported to the left side (or the right side or right in the middle), the push-out electrical spiral tube 31 is driven to actuate the left separation piece 33 to move upward while the side surface A' of the left separation piece 33 makes contact with the left upper guide rail 21 to form an extended supplementary guide rail, as shown in FIG. 4, causing the guide pin 16 of the sliding block 13 and the side surface A' which are moving to the left side to alter their original direction of the movement along line P-X, upon reaching the contact point P (as shown in FIG. 6), to keep on moving along the direction of P-Y or P-Z.

Figure 5A:
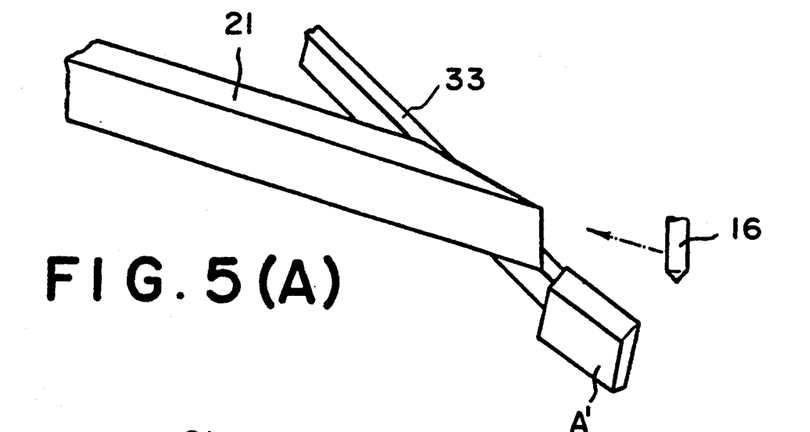
FIGS. 5A-5C are schematic views illustrating the point distribution force associated with the preferred embodiment of the present invention.
Figure 5B:
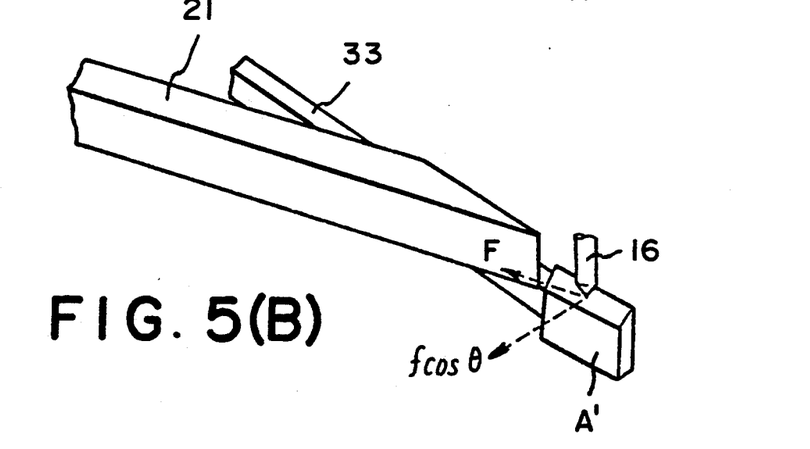
Figure 5C:
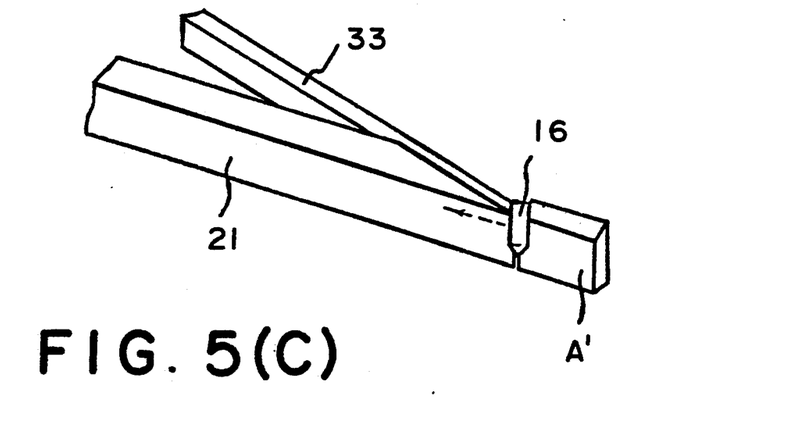

When separation pieces 33 and 34 are in the process of being elevated, the guide pin 16 has already positioned itself above the slant B of the separation piece. As a result, an $F \cos \theta$ distribution force is generated at the contact point by the slant B of the separation piece with the guide pin 16, causing the guide pin 16 to move sideways. As soon as separation pieces 33 and 34 have been elevated to the position level corresponding to that of the upper guide rail, the guide pin 16 proceeds to move forward along the direction of P-Y or P-Z.

When guide pin 16 proceeds to move forward along the upper guide rail 21 (or right upper guide rail 21', but not along both at the same time) to reach the end of the rail, it moves on to left correction guide rail 23 (or right correction guide rail 23') to resume its moving direction indicated by an arrow A. Thereafter, it transfers the article being carried by the sliding block 13 to a conveyer belt. The guide pin 16 moves on along left lower guide rail 22 (or right lower guide rail 22a', but not along both both at the same time) to return to the central position located at the front end of the preferred embodiment of the preferred embodiment of the present invention.

Figure 8:
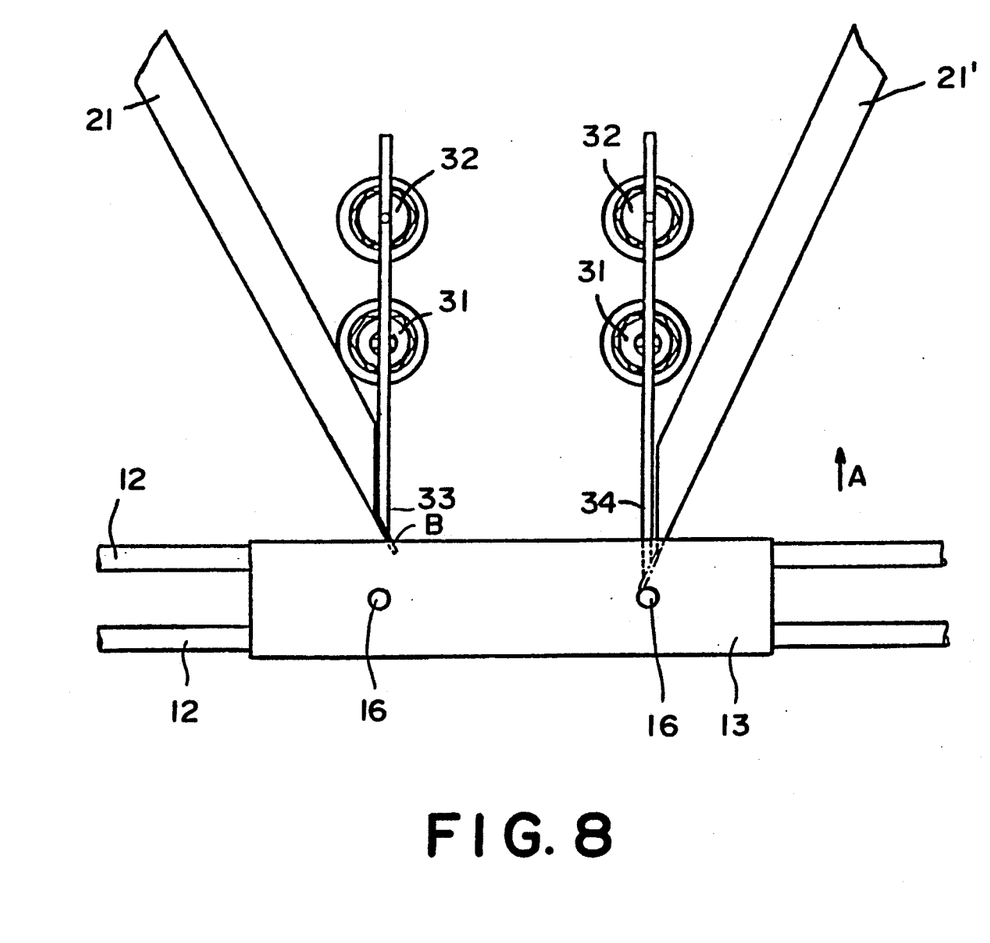
FIG. 8 shows a schematic view of positional deviation of the guide rail of the preferred embodiment of the present invention.

As shown in FIG. 8, the front ends of left upper guide rail 21' and right upper guide rail 21' are arranged with a positional deviation. As a result, when an abnormal operation of the conveyer causes left separation piece 33 and right separation piece 34 to move upward simultaneously, the guide pin 16 of the sliding block 13 will not interfere mechanically with the side surface A' of left separation piece 33 and right separation piece 34. Therefore, the break-down of the conveyer or damage to the machine parts will not happen.

On the basis of the description given above, it should be apparent that the present invention effectively overcomes the shortcomings of the prior art conveyers.

The embodiment of the present invention described above is to be considered in all respects as merely an illustration of principles of the present invention. Accordingly, the present invention is to be limited only by the scope of the hereinafter appended claims.

What is claimed is:

1. A conveyor with an automated sorting system comprising:

a transport mechanism including a motor, a pair of longitudinally extending and laterally spaced chains drivingly connected to said motor, a plurality of sliding tubes extending laterally between said pair of chains at longitudinally spaced locations, a plurality of blocks slidably mounted on said sliding tubes, a plurality of plastic sleeves disposed on both ends of each of said sliding tubes, first and second sets of protruded pins each of which is attached at one end to a respective one of said pair of chains and at another end thereof to a respective one of said plurality of plastic sleeves for interconnecting said sliding tubes to said pair of chains, a plurality of compression springs disposed about each of said first set of protruded pins between one of said pair of chains and an end of each of said sliding tubes, and two laterally spaced guide pins projecting from a lower portion of each of said plurality of blocks;

a guide mechanism including first and second sets of laterally spaced guide rails positioned beneath said plurality of sliding tubes and a set of laterally spaced correction guide rails positioned at terminal ends of said first set of guide rails, each of said first and second sets of guide rails and said set of correction guide rails being adapted to be engaged by said guide pins for guiding said plurality of blocks;

a sorting mechanism including a plurality of individually controllable separation pieces for selectively engaging said guide pins and shifting said plurality of blocks along said sliding tubes to cause one of said guide pins to engage a respective one of said first and second sets of guide rails and said set of correcting guide rails so as to reposition said blocks along said sliding tubes; and a sensor for controlling the operation of said separation pieces.

2. A conveyor according to claim 1, wherein said first set of protruded pins comprise long protruded pins and said second set of protruded pins comprise short protruded pins, each of said sliding tubes being connected to said pair of chains through one of said long protruded pins and one of said short protruded pins.

3. A conveyor according to claim 1, wherein said first set of guide rails include first ends which are laterally spaced and said first set of guide rails diverge, laterally outwardly from the first ends thereof.

4. A conveyor according to claim 1, wherein said separation pieces include slanted surfaces that are adapted to engage said guide pins, said surfaces slanting in a direction substantially perpendicular to a longitudinal direction of movement of said plurality of blocks.

* * * * *